CHARACTER-RECOGNITION APPARATUS UTILIZING COLUMNAR VARIATIONS FROM A REFERENCE LINE

Filed Feb. 15, 1962 9 Sheets-Sheet 1

TABLE I — Column from the right; TABLE II

| | 1st | 2nd | 3rd | 4th | 2/1 | 3/2 | 4/3 | 3/1 | 4/2 |
|---|---|---|---|---|---|---|---|---|---|
| 0 | l | 0 | 0 | l | 0 | 0 | 0 | | |
| 1 | l | l | 0 | 0 | 0 | 0 | 0 | | |
| 2 | k | k | k | k | 0 | - | 0 | | |
| 3 | k | l | 0 | k | 0 | 0 | 0 | | |
| 4 | l | 0 | k | 0 | 0 | 0 | 0 | + | |
| 5 | k | k | 0 | k | 0 | 0 | 0 | | + |
| 6 | k | 0 | l | 0 | 0 | 0 | 0 | | |
| 7 | k | k | k | 0 | - | + | 0 | | |
| 8 | k | k | k | k | + | 0 | - | | |
| 9 | l | k | 0 | k | + | 0 | 0 | | |

INVENTORS
GERHARD BRUST
WALTER DIETRICH
PETER MIERZOWSKI
WINFRIED SCHREMPP
BY Percy P. Lantzy
ATTORNEY INVENTORS
GERHARD BRUST
WALTER DIETRICH
PETER MIERZOWSKI
WINFRIED SCHREMPP
BY Percy P. Lantzy
ATTORNEY CHARACTER-RECOGNITION APPARATUS UTILIZING COLUMNAR VARIATIONS FROM A REFERENCE LINE Filed Feb. 15, 1962

INVENTORS
GERHARD BRUST
WALTER DIETRICH
PETER MIERZOWSKI
WINFRIED SCHREMPP

BY Percy P. Lantzy

ATTORNEY

INVENTORS
GERHARD BRUST
WALTER DIETRICH
PETER MIERZOWSKI
WINFRIED SCHREMPP
BY [signature]
ATTORNEY INVENTORS
GERHARD BRUST
WALTER DIETRICH
PETER MIERZOWSKI
WINFRIED SCHREMPP
BY [signature]
ATTORNEY INVENTORS
GERHARD BRUST
WALTER DIETRICH
PETER MIERZOWSKI
WINFRIED SCHREMPP
BY [signature]
ATTORNEY

INVENTORS
GERHARD BRUST
WALTER DIETRICH
PETER MIERZOWSKI
WINFRIED SCHREMPP

INVENTORS
GERHARD BRUST
WALTER DIETRICH
PETER MIERZOWSKI
WINFRIED SCHREMPP
BY Percy P. Lantzy
ATTORNEY

INVENTORS
GERHARD BRUST
WALTER DIETRICH
PETER MIERZOWSKI
WINFRIED SCHREMPP

BY Percy P. Lantzy
ATTORNEY

United States Patent Office 3,245,037

Patented Apr. 5, 1966

3,245,037

CHARACTER-RECOGNITION APPARATUS UTILIZING COLUMNAR VARIATIONS FROM A REFERENCE LINE

Gerhard Brust, Poppenweiler, Ludwigsburg, Walter Dietrich, Ditzingen, Leonberg, Peter Mierzowski, Schwaikheim, and Winfried Schrempp, Kornwestheim, Germany, assignors to International Standard Electric Corporation, New York, N.Y., a corporation of Delaware Filed Feb. 15, 1962, Ser. No. 174,364
Claims priority, application Germany, Feb. 17, 1961, St 17,480
9 Claims. (Cl. 340—146.3)

Figure 1:
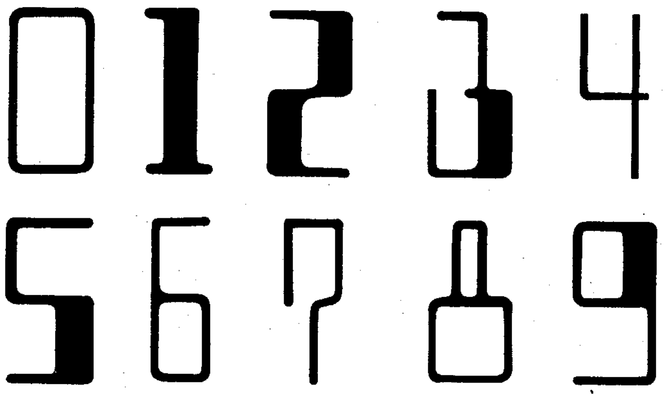

The present invention relates to a method of automatically recognizing written or printed characters.

A great number of automatic character-recognition methods and arrangements that are known can be basically divided into two groups. The first group includes those methods in which markings associated with the characters are scanned and evaluated; however, these methods can only be indirectly referred to as character-recognition methods. The second group includes those methods wherein the characters themselves are utilized for the character-recognition purpose. The most conventional manner of recognizing a character according to a method of the second group is that of comparing the unknown character to a selection of given characters. This comparison may be performed in the optico-geometrical way (e.g. with the aid of masks), or with the aid of electric circuit arrangements. Furthermore, the comparison may either be a complete coverage comparison, or may only involve certain peculiar features of the characters. Thus, it is possible, for example, to obtain the blackening sum through a transversal dimension, as well as the extreme values of the differential quotients of a line pattern, the blackening within certain ranges, the non-blackening on certain tracks (e.g. probes), and finally the shape elements. In all of these methods the scanning may be performed optically; however, it is also possible to print the characters with an electrically conducting or magnetic ink, and to design the evaluating circuit correspondingly.

All of the character-recognition methods known at present require relatively complex circuitry in order to obtain reliable results, that is, the most unambiguous criteria for marking the individual characters. In some of the conventional methods the discrimination between the individual characters is so difficult that these methods are unsuitable for practical application. Also, inevitable disturbances, such as soilings, appear in the character field which are not easily distinguishable when employing the conventional methods.

In one conventional method all parts of the lines are ascertained in both the horizontal and the vertical direction, and are used for the evaluating purpose. Therefore, with respect to the digits 0 . . . 9, this results in a substantial amount of information to be processed, necessitating a considerable investment in circuitry.

In order to reduce this expenditure it has been proposed in accordance with another conventional method, to examine only the presence of black portions within predetermined vertical columns of the characters. However, this also results in disadvantages with respect to the elimination of disturbing effects, such as dirt spots on the record. In order to provide some remedy in these cases, two photoelectric cells are arranged next to each other, and assembled or connected together so as to provide an output signal only if both photocells produce the information "black." On account of this, faulty interruptions in the line patterns of the respective rows, and individual small dirt spots can be eliminated to some extent, but, the dirt spots appearing directly after the character may easily be the cause of faulty information. For example, this is possible whenever the open bend of the digits 5, 6 or 9 is partly soiled or blurred by printing ink. There is also a problem that, due to the different lengths of the character portions in the individual columns, there is required a variation regarding the number of indicating photocells. A further disadvantage resulting from assembling the photocells in pairs will appear on bent contours of the characters, because slight displacements are likely to cause resulting information which differs entirely from the expected information.

The problems mentioned above are avoided by the character-recognition method proposed in accordance with the present invention; the basic idea consists in using the simple character-recognition methods according to the first mentioned group in which, for example, dash-shaped markings, i.e. only the vertical markings, as in one of the conventional methods, are scanned and evaluated, with the markings of one column being regarded as one code element. The method consists in selecting per marking position (column) one out of $n$ possible code elements, and in storing the result in the form of digital information. Furthermore, the difference of the distance from the defined edge of the character field of respectively two successively following code elements or parts thereof is ascertained and stored as digital information; and finally, the stored information regarding one character is evaluated with the aid of an identification circuit, and is assigned to the respective character.

The character-recognition methods wherein special markings are scanned, generally have the disadvantage that the printing field is larger than would actually correspond to the character. In order to overcome this drawback it is proposed, in accordance with a further feature of the invention, to design the characters in such a way that the code elements, in the manner known per se, coincide with parts of the character itself. The following may serve as code elements: a short dash below or above, a long dash, or no dash. The scanning of the characters may be effected photoelectrically with the aid of a row of photoelectric cells in which the output signals are stored as degrees of blackening, and are disposed of during the evaluation. Thus it is only necessary to distinguish between two ways in which the photocells can be seized, and with respect to each way it is possible to assemble a greater number of photocell outputs, e.g. five. However, if only four of these outputs are used at a time to constitute the identification criteria, it will be possible to eliminate vertical displacements to a certain extent.

It is most suitable to carry out the scanning of the characters within the infrared spectral range, because it has been proved that in this range almost all disturbances which are due to paper shading, soiling, colored pencil, ballpoint pens, ink, and normal office stamps, are strongly remittent and, consequently, have a bright effect and thus eliminated, whereas the printed characters, etc., also in this range, are only slightly remittent. Furthermore, it is appropriate to provide a light control for stabilizing the output voltages of the photocells.

The code elements can be ascertained by having the output signals of the photocells, in a particular input register comprising more storage cells than would actually correspond to the number of photocells, shifted towards the storage cells which are not connected to input channels, until a preferred one of the storage cells is acted upon by a signal and thus causes the particular identification circuit which is connected to the outputs of certain ones of the storage to respond, and to transfer digital signals to the corresponding storage device for identifying the respective code element. The height determination of the code elements can be effected by way of a simple counting, i.e. by counting the shifting steps until the identification circuit responds. When forming the difference between the counting results of two successive dashes, the resulting difference valus can be converted into the information "greater," "smaller" or "equal," being of sole importance to the determination of the height position.

In the example of embodiment described herein, it is assumed that the code elements coincide with parts of the characters, and that for each character there are provided four positions at which code elements are likely to appear.

Figure 2:
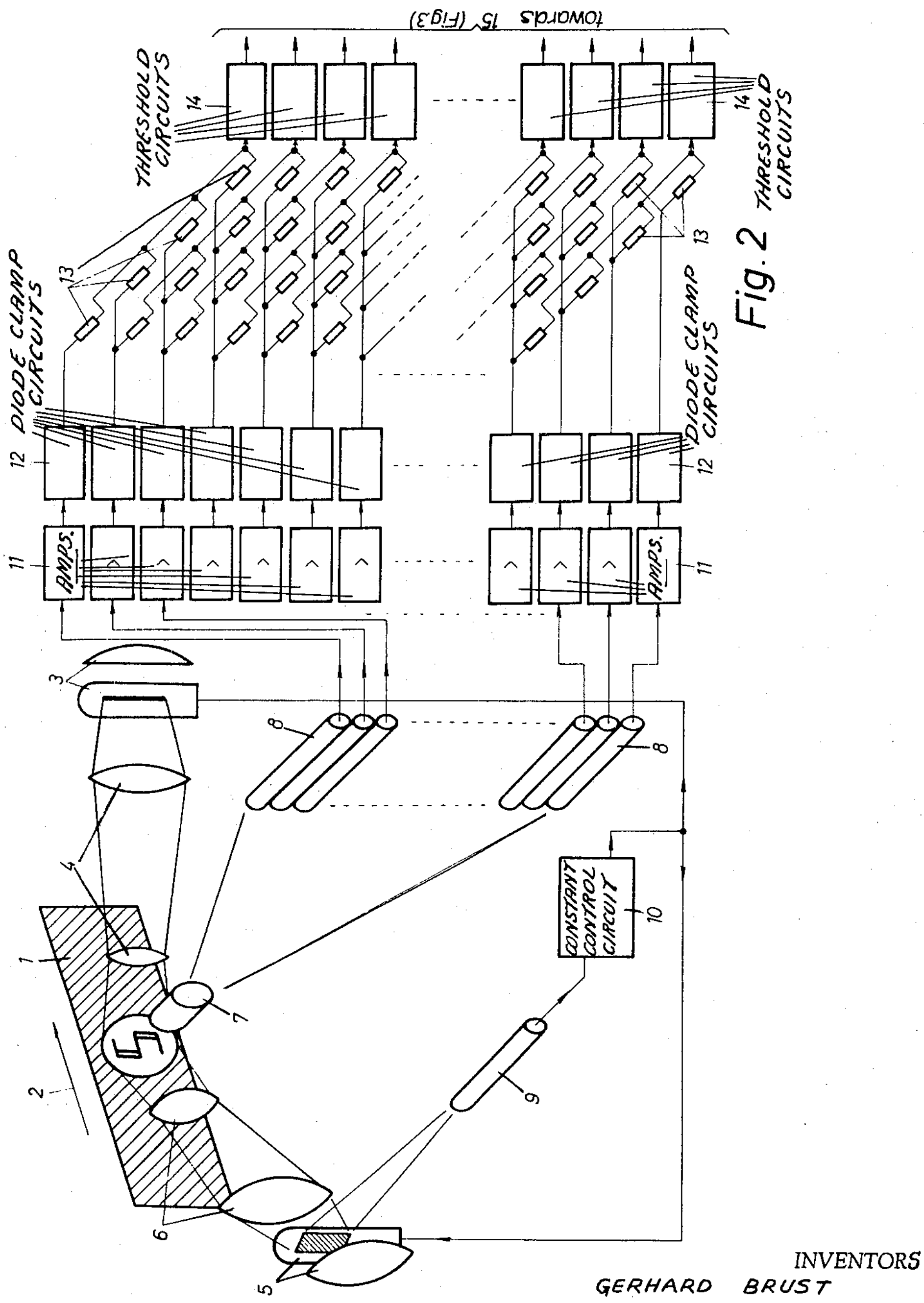
Figure 3:
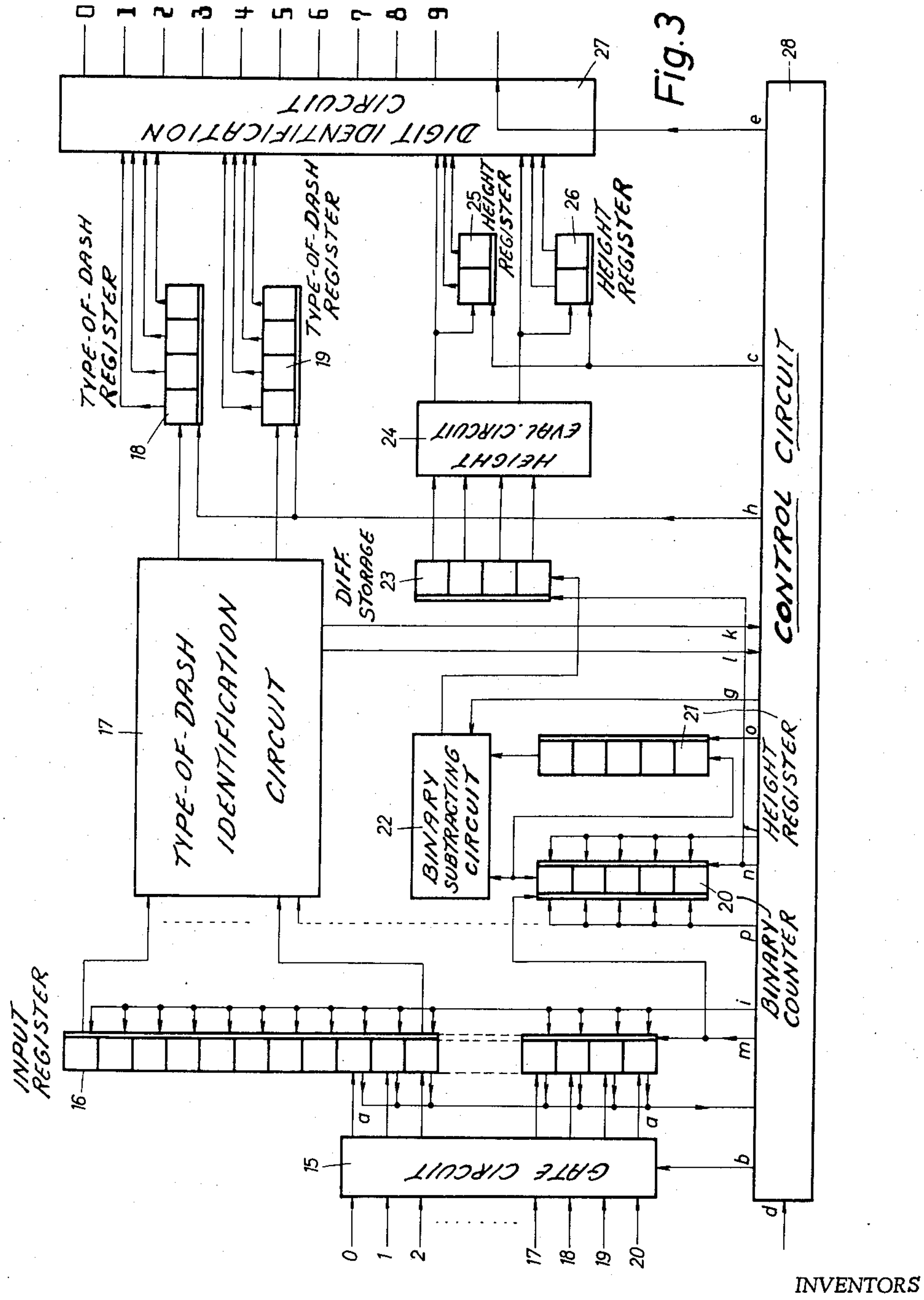
Figure 4:
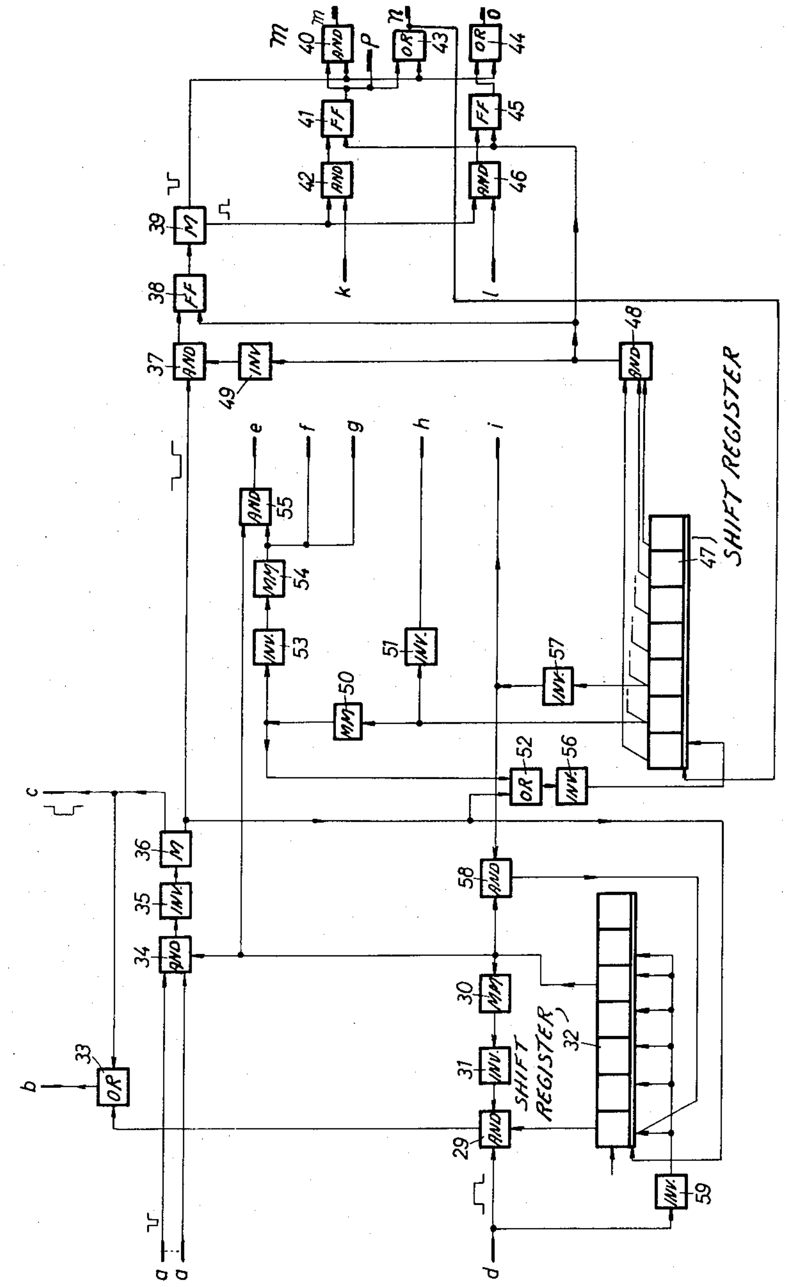
Figure 5:
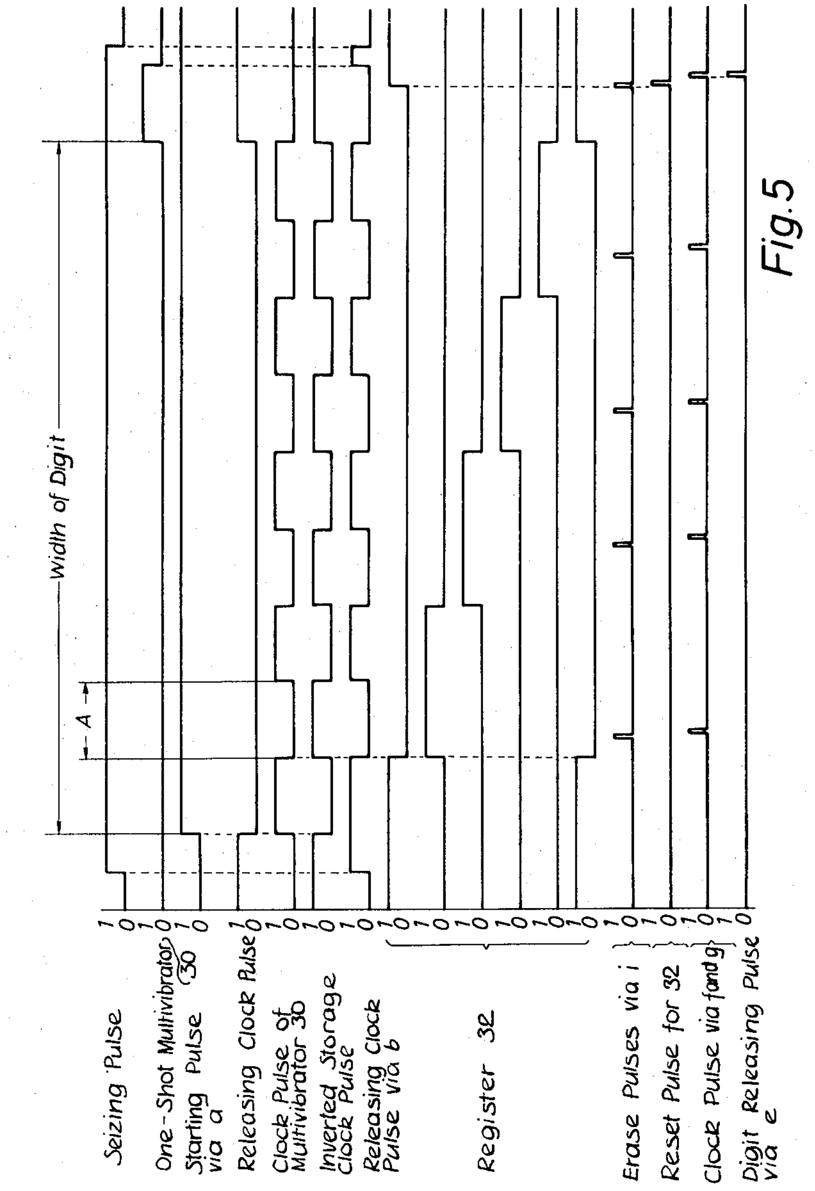
Figure 6:
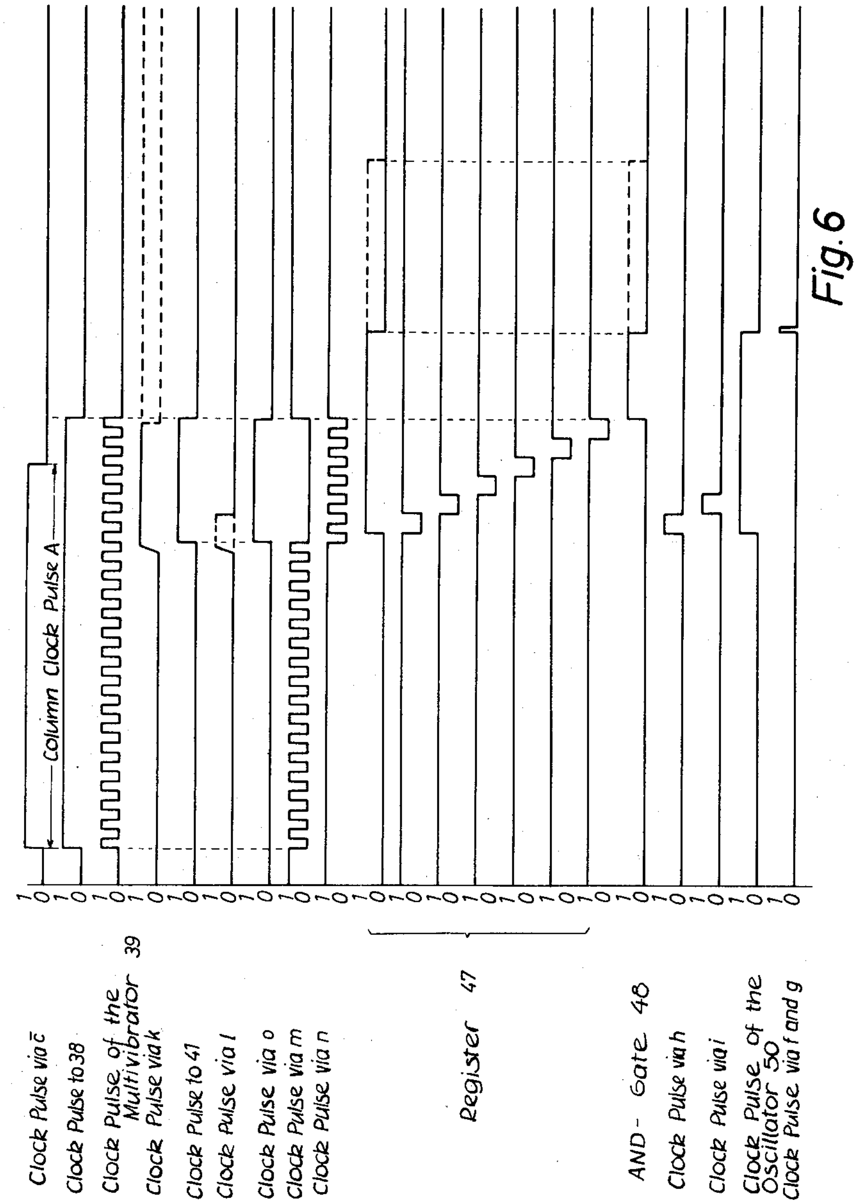
Figure 7:
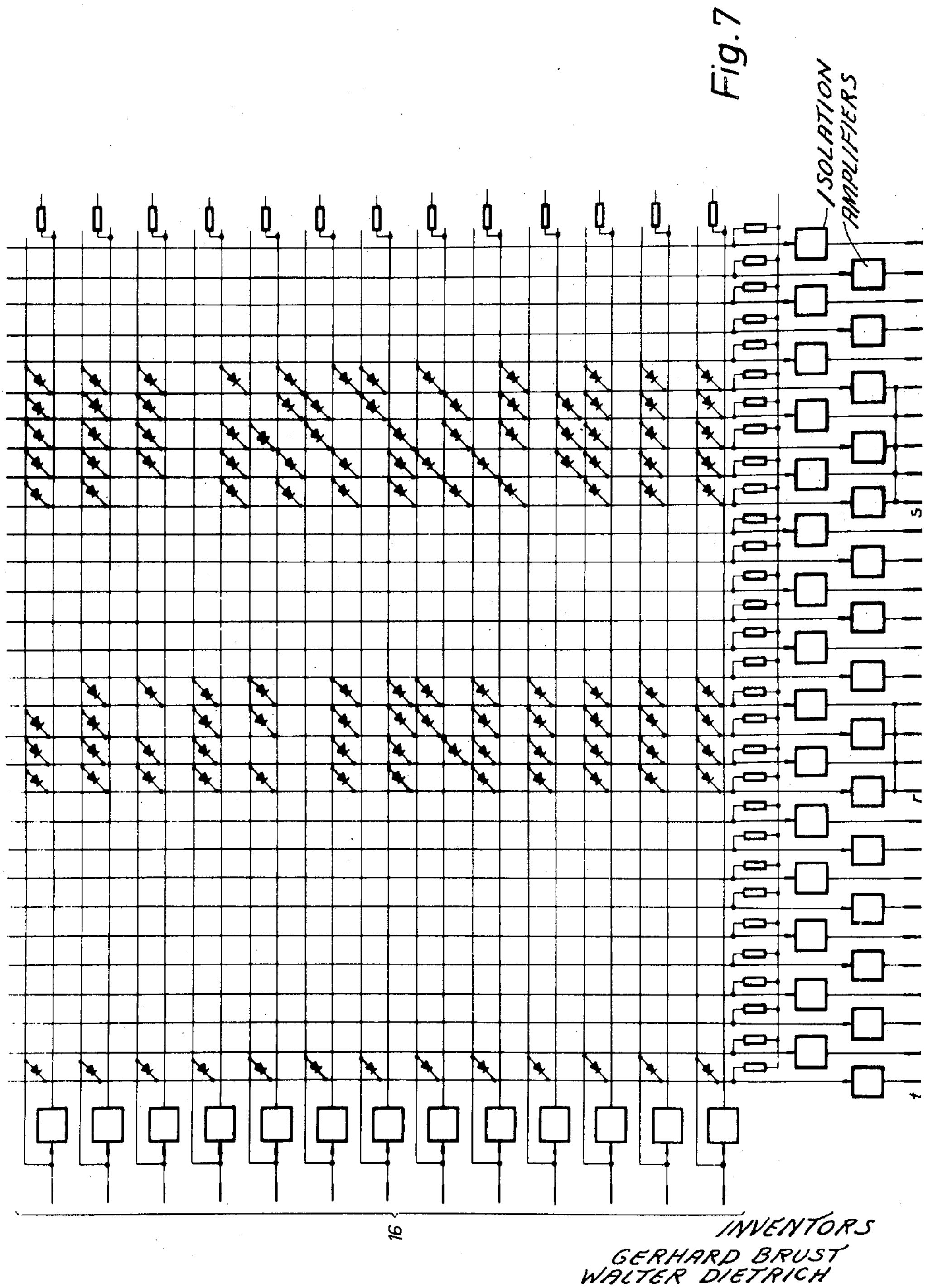
Figure 8:
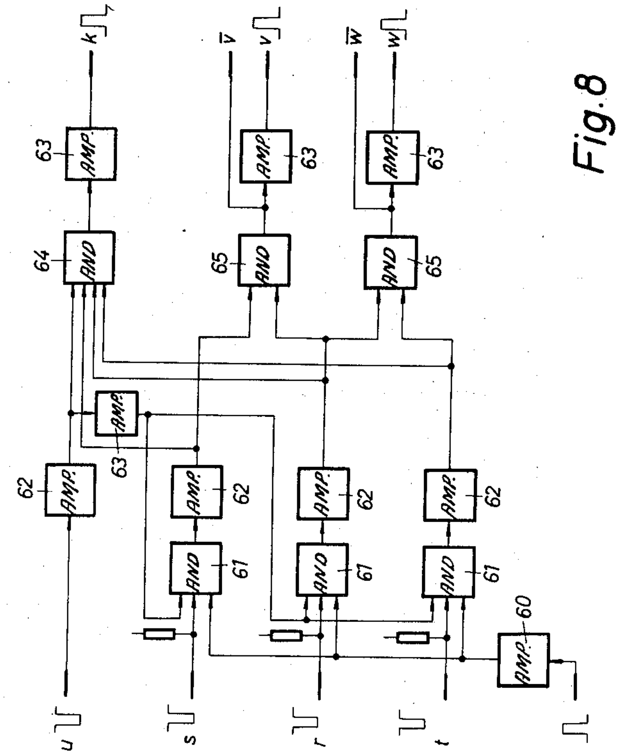
Figure 9:
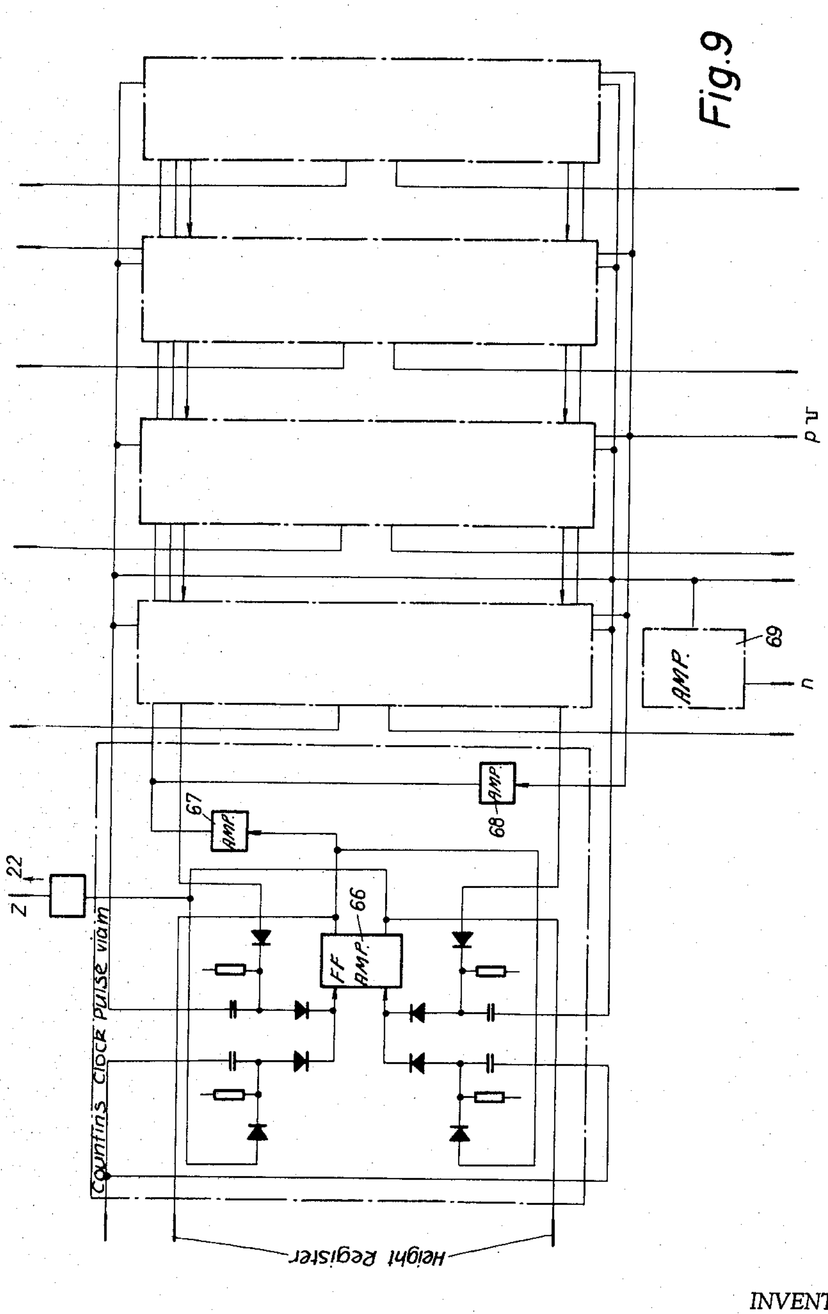

In the copending drawings:

FIG. 1 shows the digits used in the novel character-recognition method, as well as the code elements resulting from the scanning, FIG. 2 shows the scanning arrangements with the subsequently arranged digitizing circuits, FIG. 3 shows the evaluating circuits in schematic form, FIG. 4 shows the control circuits in schematic form, FIG. 5 shows the pulse diagrams relating to the evaluation of one digit, FIG. 6 shows pulse diagrams relating to the evaluation of one column, FIG. 7 shows the circuit arrangement for recognizing the type of dash, FIG. 8 shows the output circuit for recognizing the type of dash, as well as the circuit arrangement for controlling the type-of-dash storage devices, and FIG. 9 shows the binary counter for counting the shifting steps.

FIG. 1 shows the digits 0 . . . 9, and below these digits there are shown in two tables the code elements and the height differences resulting when scanning the characters from the right. The heights of the dash markings are ascertained with respect to the lower edge of the character field which, in view of the scanning optics, necessitates that the information be shifted upwards in the input-storage device; this will be described below.

In Table I:

"*l*" stands for long
"*k*" stands for short
"0" stands for no dash and in Table II:

"0" stands for the height of the dash under consideration which is equal to the height of the preceding dash
"—" stands for smaller height
"+" stands for greater height.

FIG. 2 shows the voucher 1 on which, for the sake of clarity, only the digit 5 is shown on an enlarged scale. This voucher 1 is moved in the direction indicated by the arrow 2, past the optical imaging system, and is illuminated by the two infrared sources of light 3 and 5 via the optics 4 or 6 respectively, at an angle of about 45°. The light which is remitted in the vertical direction, is projected by the optical imaging system 7 onto the photodiodes 8 arranged vertically on top of each other in one row. By illuminating the voucher from both sides it is possible to prevent shadows which may otherwise result on account of bends or folded portions in the paper and may easily be read as dashes.

The light intensity is kept consant via the special kind of photodiode 9, and the control circuit 10, simultaneously serving to compensate the appearing voltage variations as well as, to some extent, the sensitivity variations of the photodiode as a function of the temperature. The projection lamps are operated by an undervoltage, so that the average lifetime is increased, and the spectral range is shifted in a direction towards the infrared. The maximum sensitivity of the photodiodes is likewise within the infrared spectral range. The resulting selective scanning of the characters within the infrared spectral range, which may be assisted by special types of glass filters, has the advantage that most of the soilings, such as ink, ball-point pen, blue stamping ink, colored pencils, and the like, can be regarded as being negligible due to their high remission within this spectral range. Of the other known types of soilings, only pencil and black stamping ink will have the same effect. Both of them, however, have a low constant remission factor throughout the entire spectrum.

Each output of the photocells is connected to one A.C. amplifier 11 having an adjustable amplification factor in order to compensate for variations with respect to the sensitivity of the individual photodiodes. At the output of the A.C. amplifiers there is established the D.C. amplitude of the pulses on account of the pulse shape and the pulse ratio. In order to obtain defined voltage ratios, the output voltage is adjusted in such a way with the aid of the diode-clamping circuit 12, that the minimum amplitude, corresponding to the paper, will always be kept at a constant voltage level.

The outputs of each four neighboring diode-clamping circuits 12 are connected to one another via the summation circuit consisting of four resistors 13, so that always four neighboring output voltages of the photo-amplifiers are added. In view of this, the circuit arrangement acts like a filter which amplifies vertical dashes, and weakens horizontal or inclined dashes.

In the present example there are provided 24 stacked photocells; owing to the combined arrangement with the aid of the summation circuit, there will thus result 21 output channels which are connected to the threshold circuits 14, and by the latter, to the inputs of the gate circuits 15 (FIG. 3). These threshold circuits serve to digitize the output voltages, in other words, they provide an output voltage as soon as the output voltage of the photocells exceeds a predetermined threshold voltage value. This results in some advantages.

When assuming, for example, that a grey printed digit is black up to 80%, that a strongly printed digit is 100% black, and that the grey digit is still supposed to be readable, then the threshold circuit may be adjusted in a way as to indicate "Black," in other words, to provide an output signal if either the four combined photodiodes each indicate at least 60% black, or if the three photodiodes indicate 80% black, and the fourth photodiode 0% black=white, or if any other value appears between these two extreme cases.

Accordingly, disturbances which are not eliminated by the spectral scanning, will not result in a black signal if they do not completely cover at least three photodiodes, so that e.g. horizontal or inclined pencil dashes and small spots of printing ink will not cause the release of a trouble-indicating signal. To provide a further improvement of the output signals, the amplifiers 11 operate with a bent characteristic. Accordingly, the amplifiers operate in the usual way in an approximately linear fashion, up to the photodiode voltages corresponding to the value of 80% black. All voltages corresponding to a higher black value, e.g. 100% black, are cut off; in other words: the amplifier-output voltage lying at the input of the resistance network is, in the case of 100% black, just as high as in the case of 80% black. In this way the above mentioned troubles are eliminated to the same extent if the blackening degree of the digits varies between 80 and 100%. Without applying this measure it could easily happen that a black-signal is released in cases where two photodiodes indicate 100%, one photodiode indicates 40% (light-grey fault), and one photodiode indicates white.

With respect to the amplifiers 11, the diode-clamping circuits 12 and the threshold circuits 14 it is possible to use circuit arrangements of known design, so that a detailed explanation may be omitted.

Upon reading the first code dash of the digits, the reading analyser starts with the scanning and the evaluation, by scanning the character in each column once, and by storing the information of this column. Depending on the type of code dash (short dash, long dash, no dash) digital signals will appear at predetermined outputs of the threshold circuits 14 and which, via the gate circuit 15 (FIG. 3), are stored into the input register 16. The storage cycle (clock-pulse) is released by the first code dash of the digit, and is re-blocked after exactly four cycles (clock-pulses), corresponding to a number of four columns. The code dashes of the digits are evaluated during the clock-pulse intervals.

During the first clock-pulse interval the stored dash is shifted so far upwards in the input register 16, comprising more cells than would correspond to the number of output channels of the threshold circuits 14, that the connected identification logic is caused to respond. In this position the type-of-dash identification circuit 17 will respond. If the column under consideration contains no code dash, i.e. if no stored information is contained in the input register, then the identification circuit 17 will immediately respond to the first shifting clock-pulse. In cases where the top cell of the register 16 contains information, it is intended to indicate that the stored information has not been recognized by the type-of-dash identification circuit.

Accordingly, the type-of-dash identification circuit 17 is capable of providing the four different types of information: "long dash," "short dash," "no dash" and "not recognized." The corresponding output information is then stored in binary form into the type-of-dash register 18 or 19 respectively; hence according to the number of columns, four stages are provided in each register, so that for each output information there is each time seized (occupied) one stage in both the register 18 and the register 19.

At the same time when the stored information is shifted in the register 16, the height of the dash is determined, that is, the distance of a dash from a defined lower edge of the character field. To this end it is possible to use the binary counter 20 which effects the counting of the shifting steps. In the course of a further operating cycle the binary counter is operated like a shift register by providing a corresponding switch-over and the number stored in the binary counter, is shifted into the height register 21. Together therewith, the numbers of the binary counter 20 and of the height register 21 are stored in a step-by-step manner into the binary subtracting circuit 22, and the difference between the two numbers is formed in a bit-wise fashion. In this way there is obtained the height difference of two dashes that have been stored successively. If a column with a dash-marking is followed by a column without a dash, then it is impossible to determine the difference. In this case the number stored in the height register will not be erased, but compared with the marking of the next successive column.

The way of controlling both the counter 20 and the register 21 will be described in detail below. The computed difference data is stored in the difference storage device 23, and is then converted into the three output information items "higher," "equally high" and "lower" by the evaluating circuit 24. The respective one of the three statements is finally stored in the two dash-height registers 25 and 26. These registers or storage devices 25 and 26 are designed in the same way as the storage devices 18 and 19, that is, each time one stage of both storage devices stores the information applying to the respective case under consideration. In the case of four columns there will result three difference values, so that actually the two storage devices 25 and 26 would have to contain three stages; the third stage, however, can be avoided by transferring the last evaluation directly to the digit-identification circuit 27 at the correct time position.

In this way all information is stored which is necessary for identifying the digits. The outputs of the storage devices 18, 19 and 25, 26 are connected to the digit-identification circuit 27 in which the different output information items are assigned to the individual digits.

After this general description, the individual steps of the control process will be explained in detail. FIG. 4 shows the block diagram of the control circuit which is schematically denoted by the rectangular block 28 in FIG. 3. The diagrams of FIGS. 5 and 6 serve to explain the individual operating cycles in relation to time.

At first the arrangement is in its normal position, that is, the record means (voucher) has not yet reached the scanning point. As soon as this record means reaches the scanning point a so-called voucher pulse is produced via two photodiodes (not shown in FIG. 2). One of these two diodes lies in front of the scanning point, and the other one behind the scanning point. This voucher pulse is applied to the control circuit if both photodiodes are covered-up by the record means (voucher). In this way the shadows produced by the beginning and the end of the voucher will not be read as dashes.

The voucher pulse is now applied to the AND-gate 29 which, in turn, produces an output signal because all three inputs are positive. The monostable multivibrator 30 is in its zero position, hence, via the inverter 31, produces the second positive input pulse, whereas the third input is positively marked by the first stage of the shift register 32 (see the corresponding diagrams in FIG. 5). In its initial state the shift register 32 comprises from the left to the right, the stored information 1 0 0 0 1. The output signal of the AND-gate 29, via the OR-gate 33, transmits a release signal to the gate circuit 15 (FIG. 3), thus effecting the storing of the scanned information into the register 16. Together with the storing of the first dash into the register 16, via the outputs *a* thereof, a start pulse is transmitted for the evaluation, i.e. the output signals of the register 16 are applied via the lines *a* to the AND-gate 34 which operates as long as all of the inputs are not positioned at 1. Accordingly, this AND-gate 34, with respect to the negative input pulses, acts like an OR-gate. The output signal of the inverter 35 unblocks the multivibrator 36 for transmitting at its two outputs, two trains of clock-pulses which are inverted with respect to one another. Accordingly, the AND-gate 34 or the inverter 35 respectively, provide the release signal for the storage clock-pulse (cycle). The release of the storage cycle must now be maintained for the period of four clock-pulses. In order to ensure this, the fifth stage of the register 32, is connected to the AND-gate 34 which is positioned at 0 from the end of the first to the end of the fourth storage cycle. In this way the release of the storage cycle will also be maintained if all stages of the register 16 are positioned at 1, hence after the register has been erased. By the end of the fourth storage cycle, the fifth stage of the register 32 is reset to 1, and the stored information in the register 16 is erased, so that now all inputs of the AND-gate 34 are marked by 1, thus causing the multivibrator 36 to be reblocked.

The duration of the clock-pulses of the multivibrator 36 is chosen so that all storing and evaluating processes may be carried out during this time. In cases where the output *c* is marked, there is effected the storing, and in cases where the output $\bar{c}$ is marked, there is effected the evaluation of the stored information, or the erasure of the register 16 respectively.

The inverse storage cycles (clock-pulses) at the output $\bar{c}$ serve the stepping-on of the shift register 32, so that the 1 whicn is stored at the beginning in the first stage, is stepped on by one stage upon each scanned and evaluated column. Upon application of the first shifting pulse to the register 32, a "0" is stored into the first stage, as is indicated by the small arrow at this stage, in order to make sure that this stage is positioned at "0." Accordingly, after the fourth clock-pulse, the fifth stage will again receive a 1. Upon marking of the second stage of the shift register 32, the AND-condition at the output of the first stage will be lost, so that the AND-gate 29 is incapable of delivering an output signal. However, in order to make sure that the input is also free with respect to the following columns, the storage clock-pulses are fed to the OR-gate 33 from the output $c$ of the multivibrator.

The inverse storage clock-pulses of the output $\bar{c}$ of the multivibrator 36 are simultaneously fed to the AND-gate 37, which now delivers an output signal for reversing the flip-flop 38 into its position 1. The other input of the AND-gate is marked 1, because the first stage of the shift register 47 is initially positioned at 0. In this way there is started the multivibrator 39 which, in turn, delivers the evaluation clock-pulses. By the end of each storage clock-pulse, hence at the beginning of the inverse storage clock-pulse, there is started the evaluation of the code element (dash) stored in the input register 16.

FIG. 6 shows the pulse diagrams relating to the evaluating clock-pulse of one column indicated by the reference A in FIG. 5.

In the present example the multivibrator 39 provides up to 23 clock-pulses per column. These clock-pulses are transferred via the AND-gate 40 and the line $m$, to the register 16 in the form of shifting clock-pulses, and to the counter 20 in the form of counting clock-pulses. The AND-gate 40 is opened because the flip-flop 41 is at first in its position 1. The shifting clock-pulses are blocked in cases where the stored information is shifted to such an extent that the kind of dash-identification circuit 17 will respond. In this case a signal will be applied from the circuit 17 via the line $k$, to the AND-gate 42; the second input of this AND-gate is connected to the second output of the multivibrator 39, so that now a signal will be applied to the flip-flop 41, for reversing the latter into its zero position. In this way the AND-gate 40 is blocked, and no further shifting clock-pulses can be applied to the register 16.

The negative clock-pulses of the multivibrator 39 are simultaneously applied to the OR-gates 43 and 44, but are not yet effective at the output of these circuits or gates, because both outputs are positively marked from the flip-flop 41 or 45 respectively. However, if the flip-flop 41 has been reversed into its other position by the pulse over the line $k$, then the pulses of the multivibrator 39 will be applied in the form of counting clock-pulses, via the line $n$, to both the binary counter 20 and the shift register 47.

Together with the pulse applied via the line $k$, and in the presence of either a long or short dash, there is also produced a pulse by the circuit or gate 17 via the line $l$ to the AND-gate 46 which, by the positive clock-pulse of the multivibrator 39, is opened and serves to reverse the flip-flop 45. In this way the counting clock-pulses are enabled to reach the height register 21 via the line $o$. In cases where there is ascertained "no dash" or "not recognized," the line $l$ is not marked, so that also no clock-pulses are applied to the height register 21. Consequently, the storage device will remain unchanged, in other words, the stored information will be maintained in the case of this evaluating clock-pulse, as already mentioned above.

Accordingly, the counting pulses via the lines $n$ and $o$ serve as shifting clock-pulses for the binary counter 20 and the height register 21. To this end the binary counter is still switched over from counting to shifting via the line $p$, which is marked whenever the flip-flop 41 is in its position 0. The numbers transmitted out of the registers 20 and 21, are applied to the subtracting circuit 22 where they are subtracted in a bit-wise fashion.

The shift register 47 is stepped-on by respectively one stage by each clock-pulse transmitted over the line $n$. In the initial state the first stage is positioned at 0, and all other stages at 1. By the first clock-pulse transmitted over the line $n$, the "0" is shifted into the second stage, and a "1" is stored into the first stage from the outside, which is indicated by the arrow at the first stage. After five counting clock-pulses, which corresponds to the number of stages of the registers 20 and 21, all of the stages will have assumed their 1-position. In this way the AND-gate 48 is permitted to respond; this gate now delivers a signal to the flip-flop 38 which is returned to its initial position, and thus causes the switching-off of the multivibrator 39. The output signal of the AND-gate 48 is also applied to the flip-flops 41 and 45 for returning them to normal, and for preparing this portion of the circuit arrangement for the next successive evaluation (column).

Finally, the output pulse of the AND-gate 48 is still applied to the inverter stage 49, so that now the AND-gate 37 is also blocked. In cases where the end of the counting clock-pulses does not coincide with the end of the inverse storage clock-pulse, this measure is supposed to prevent the still applied inverse storage clock-pulse from reversing the flip-flop 38 again into its operating position.

The shift register 47 still has to perform further functions. If the "0" is stored in the second stage, then an output signal is applied to both the monostable multivibrator 50 and the inverter 51. The output signal of the inverter 51, via the line $h$, transmits the instruction for storing the kind of dash determined by the type-of-dash identification circuit 17, into the two registers 18 and 19 (FIG. 3). The pulse duration of the monostable multivibrator 50 is so dimensioned that the operations which are necessary for evaluating the dashes, are reliably terminated upon reversal. Upon reversing of the monostable multivibrator 50, a pulse is applied to the OR-gate 52, as well as to the inverter 53. The inverter output controls the monostable multivibrator 54 which transmits a short pulse which is applied to the AND-gate 55 and which, via the line $f$, effects the erase of the binary counter 20, and via the line $g$, the erase of the overflow in the subtracting circuit 22. The AND-gate 55 is still prevented from operating, because the second condition has not yet been met by the output of the fifth stage of the shift register 32. Only after this stage also returns to its position 1, that is, after all columns have been evaluated, the AND-gate 55 will respond, and will transmit a digit-releasing pulse to the digit-identification circuit 27 via the line $e$. This pulse only serves to activate the identification circuit. The pulse which is applied from the monostable multivibrator 50 to the OR-gate 52 serves as a reset pulse, via the inverter stage 56, for the first stage of the shift register 47, and only resets this stage to "0," after the inverse clock-pulse is no longer applied to the line $\bar{c}$. In this way the blocking of the AND-gate 37 is again eliminated.

If the "0" is placed in the third stage of the shift register 47, then a pulse is applied via the inverter 57, to the AND-gate 58. If the last stage of the shift register 32 contains a "1," that is, in the fifth inverse storage cycle, then the AND-gate 58 is permitted to respond, and to transmit a pulse to the first stage of the shift register 32, so that this stage is reset to the position "1."

The output pulse of the inverter 57, via the line $i$, likewise serves as an erase pulse for the input register 16.

After the last stage of the shift register 32 is again in its position 1, the AND-gate 34 is prepared, and the monostable multivibrator 30 is started, so that the AND-gate 29 becomes blocked. This time serves to define the distance between the digits.

The voucher pulse on the line $d$ will disappear again after all characters of the respective voucher have been scanned, so that now, via the inverter 59, the shift register 32 is reset to the initial position 1 0 0 1, as is characterized by the position of the input lines.

The dash-lined continuation of the pulses in the fourth, tenth and seventeenth row of the diagrams shown in FIG. 6, is to indicate that in all cases there is not required the entire time of the inverse storage clock-pulse for the evaluation; thus, for example, in columns without a dash marking, there appear no shifting pulses at all, whereas the number of shifting pulses is smaller in the case of long dashes, i.e. smaller than with respect to short dashes in the upper portion of the character field.

The indicating pulse in the sixth row is omitted in the absence of a dash, or if "not recognized" is reported. For this reason this pulse is likewise indicated by dash-lines.

With respect to the character-recognition method described above it is possible to use circuit elements of the type known in the art. Thus, for example, FIGS. 7 and 8 show one type of embodiment relating to the type-of-dash identification circuit 17. This circuit substantially consists of the diode matrix shown in FIG. 7. The rows of the matrix are connected to the outputs of the respective storage cells of the input register 16. By correspondingly arranging the diodes in the matrix an output signal will be obtained on the line *r* in the case of a short dash, and on the line *s* in the case of a long dash. The line *t* will provide an output signal if no dash exists in the scanned column. The free columns in the matrix may also be used for establishing other assignments.

FIG. 8, in schematic form, shows the connection of the output lines of the type-of-dash-identification circuit 17 in order to obtain the four possible binary signals by which the registers 18 and 19 are acted upon, i.e.

00 stands for not recognized,
01 stands for long dash,
10 stands for no dash,
11 stands for short dash.

In this case the signals of the first code column appear on the line *w*, and those of the second code column appear on the line *v*.

The amplifier stage 60 serves as the inverter for the positive signal appearing at the input thereof, and which is present if all storage cells of the input register 16, which are not connected to the type-of-dash identification circuit, are white. The AND-gates 61 provide a positive output signal if at least one input is marked positively, and a negative output signal, if all inputs are marked negatively. The circuits 62 are amplifiers not effecting a reversal of the polarity of the input signal, whereas the amplifiers 63 operate as inverter stages. The AND-gate 64 provides a negative output signal if at least one input is marked negatively, and the AND-gates 65 respond if both inputs are negative.

Accordingly, the above mentioned conditions will result at the outputs *v* and *w* in accordance with the signals appearing on the lines *r, s, t, u*. The pulse on the line *u* exists whenever the top storage cell of the input register is occupied by a black-information, that is, whenever the just stored dash has not been recognized.

Via the AND-gate 64 and the following inverter 63 there is produced the centering pulse which is applied to the control circuit (FIG. 4) via the line *k*.

FIG. 9 shows an example relating to the counter 20 which may be randomly switched over from counting to shifting. This counter 20 contains five stages, of which only one is shown in detail, because the other stages are designed in the same way. The counting clock-pulses are applied via the line *m* to the first stage of the counter; the stages are composed of ordinary flip-flop amplifiers 66. If the counting pulses are applied via the line *m*, then the feedback-coupling arrangements act in such a way that the stages will operate like a binary counter, that is, after each second input pulse one carry-over pulse is applied via the amplifier 67 to the following stage. If the counter is to operate like a shift-register, then the line *p* is marked negatively, so that via the amplifier 68, a decoupling potential is applied to the output of the amplifier 67 for bringing about the condition that no carry-over pulse will be applied to the following stage. The shifting pulses on the line *n* are applied, via the amplifier 69, to all 1-inputs of all stages of the counter. As will be easily understood, there is effected in this way a displacement or shifting of the stored information from the right to the left. The output of the first stage is connected, via the line *z*, to the subtracting circuit 22, and via the lines *y* and $\bar{y}$, to the height register 21.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Character-recognition apparatus comprising means for scanning characters in a column-wise fashion to detect the pressure of code elements which have been preassigned in a column pattern to said characters, evaluating means to determine the form of each of said detected elements and the relative distance of successive elements from a defined edge, and means to identify the character from said form and relative distance.

2. Character-recognition apparatus comprising means for scanning characters in a column-wise fashion to detect the pressure of code elements which have been preassigned in a column pattern to said characters, evaluating means for determining the form of each of said detected elements and the relative height of each two successively following elements from a defined edge of said characters, and means to identify the character from said form and relative height evaluations.

3. Character-recognition apparatus comprising means for scanning characters to detect the presence of one out of *n* possible code elements arranged coincident with said characters, said scanning means including a plurality of photosensitive cells, means to advance said characters for scanning by said scanning means, means coupled to said scanning means to register if the output of said scanning means exceeds a threshold value and to convert said output into digital information, means to store said digital information, and means to identify the stored digital information, said storage means including an input register comprising a plurality of storage cells in excess of the number of photosensitive cells coupled thereto, the said means to identify the stored digital information including a type-of-dash identification circuit coupled to said input register, and a pair of type-of-dash registers coupled to the output of said identification circuit, for storing digital information representative of said code elements.

4. Character-recognition apparatus comprising means for scanning characters in a column-wise fashion to detect the presence of code elements which have been preassigned in a column pattern to said characters, evaluating means to determine the form of each of said detected elements and the relative distance of each two successively following elements from a defined edge, and means to identify the character from said form and relative distance evaluations.

5. Character-recognition apparatus as in claim 3 wherein said identification means further includes means to assess the relative heights of successive code elements of an individual character.

6. Character-recognition apparatus as in claim 5 in which said height-assessing means includes a counter coupled to said input register, a height register coupled to said counter, a binary subtracting circuit coupled to both said counter and said height register, a difference-storage device coupled to said binary subtracting circuit, a height-evaluation circuit coupled to said difference-storage device and a pair of height registers coupled to said height-evaluation circuit, said counter being adapted to count the shifting steps of said input register until said identification circuit responds, and said binary subtracting circuit being adapted to derive the difference between successive counts of said shifting steps.

7. Character-recognition apparatus as in claim 6 further including dash-identification means coupled to said type-of-dash registers and said height registers.

8. A character-recognition apparatus as set forth in claim 3, wherein said type-of-dash identification circuit further comprises a matrix having diodes arranged at predetermined connection points with the rows of said matrix connected to the outputs of the respective storage cells of said input register and the column outputs coupled to logic circuitry for obtaining the proper digital signals for transfer into said type-of-dash registers.

9. A character-recognition apparatus as set forth in claim 6, wherein said counter further comprises a plurality of stages each of which includes a flip-flop amplifier with feedback-coupling means for carrying over one pulse to the next stage, and including an additional input for supplying a decoupling potential.

References Cited by the Examiner

UNITED STATES PATENTS

| | | | |
|---|---|---|---|
| 2,265,445 | 12/1941 | Paris | 340—146.3 |
| 2,932,006 | 4/1960 | Glauberman | 340—149 |
| 3,005,106 | 10/1961 | Wilkins | 340—146.3 |
| 3,025,495 | 3/1962 | Endres | 340—149 |

MALCOLM A. MORRISON, *Primary Examiner.*